F. F. HEISELMANN.
HORSESHOE CALK.
APPLICATION FILED JUNE 7, 1913.
1,090,055.
Patented Mar. 10, 1914.
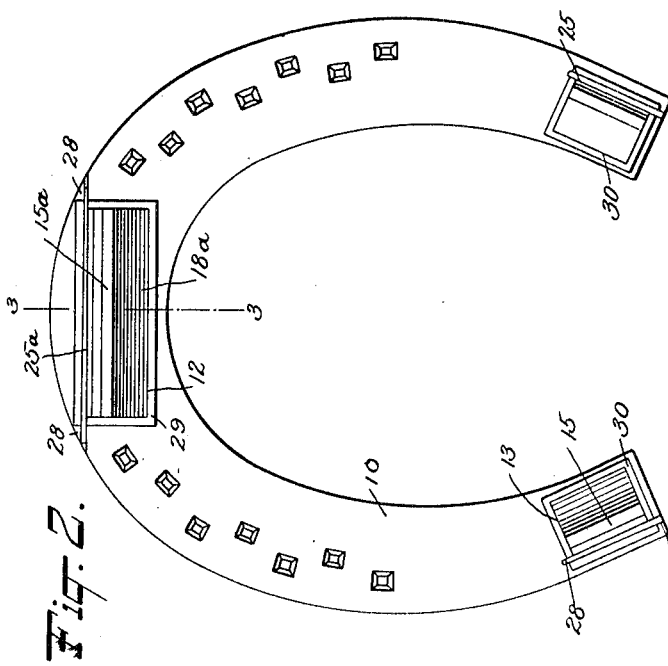
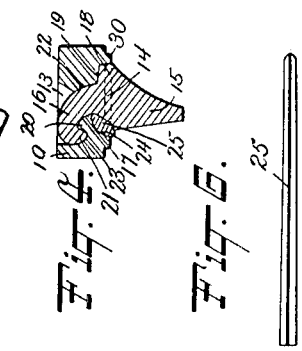
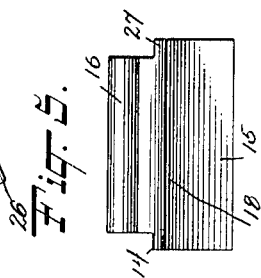
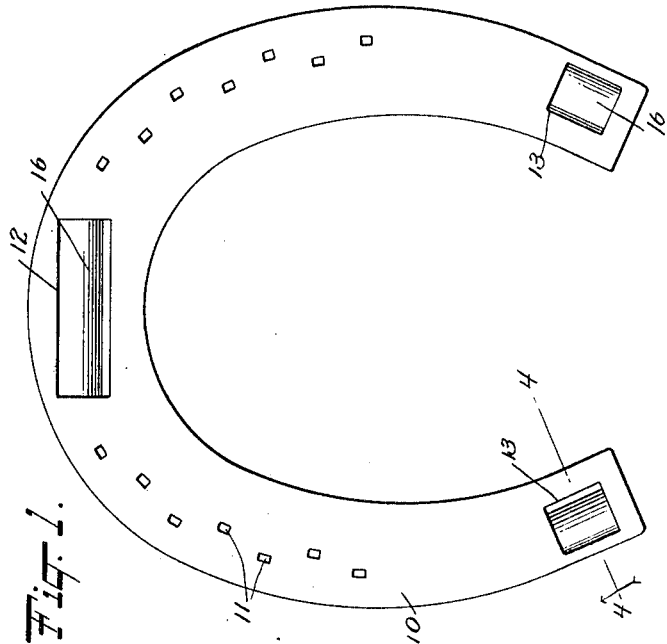
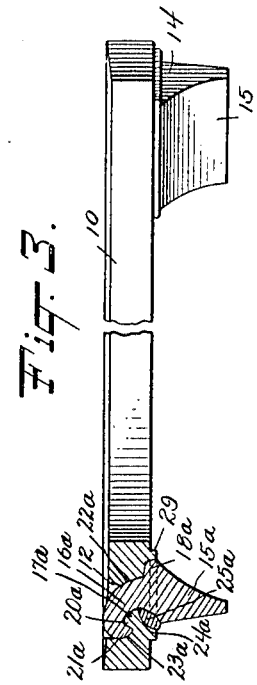
WITNESSES
George Bambay
John W. Brackerzel
INVENTOR
Frank F. Heiselmann
BY Munn & Co.
ATTORNEYS

UNITED STATES PATENT OFFICE.

FRANK F. HEISELMANN, OF CINCINNATI, OHIO.

HORSESHOE-CALK.

1,090,055.  Specification of Letters Patent. Patented Mar. 10, 1914.

Application filed June 7, 1913. Serial No. 772,290.

*To all whom it may concern:*

Be it known that I, FRANK F. HEISELMANN, a citizen of the United States, and a resident of Cincinnati, in the county of Hamilton and State of Ohio, have made certain new and useful Improvements in Horseshoe-Calks, of which the following is a specification.

This invention relates to calks for horseshoes and the like, and has reference more particularly to the combination with a horseshoe provided with a recess, of a calk having a point and a head adapted to be received in and fit into the recess, and a keeper coöperating with the calk and the recess of said horseshoe to secure the calk against accidental displacement.

The object of the invention is to provide a simple strong and durable calk for use with horseshoes and the like of different kinds to minimize slipping on icy or wet pavements, which can be readily applied to the horseshoe and removed therefrom, and which, when worn or injured, can be readily replaced, which may be of different forms and sizes, and which cannot be easily accidentally displaced regardless of the conditions under which it is used.

The invention consists in the combinations, constructions and arrangements herein described and claimed.

Reference is to be had to the accompanying drawings forming part of this application in which similar reference characters indicate like parts in the several views and in which—

Figure 1 is a plan view of a horseshoe having calks applied thereto, embodying my invention, Fig. 2 is an inverted plan view of the horseshoe showing the calks attached thereto, Fig. 3 is a transverse section on the line 3—3 of Fig. 2, Fig. 4 is a similar view on the line 4—4 of Fig. 1, Fig. 5 is an elevation of one form of the calk showing the same removed from the horseshoe, and Fig. 6 is a side view of one of the keepers used in securing the calks to the horseshoe.

Before proceeding with a more detailed explanation of my invention it should be clearly understood that while I have shown for example herewith calks having "points" of certain form, this structural feature can be altered as desirable or necessary. For instance the "point" of the calk may present a serrated edge or may actually constitute a sharpened point. Furthermore, while I have used for illustration a horseshoe having both toe and heel calks applied thereto, if so desired, one or the other only of these may be used.

Referring more particularly to the drawing, I have shown a horseshoe 10 of the customary shape provided with inner and outer openings 11 to receive the horseshoe nails which serve to attach it to the hoof of the animal. At the toe of the horseshoe, and near each of the heel ends thereof, are provided openings respectively 12 and 13. Of these the former is of elongated shape and the latter are substantially square. The toe-calk 14 has a part 15 of tapered cross section forming the point of the calk, and has a hook-shaped head 16 curved forwardly and downwardly, presenting at the front a rounded concavity 17 extending longitudinally of the calk, and having at the back a rearwardly extending rib 18 formed at the junction of the point and the head of the calk. The openings 13 have at the rear lower edge a longitudinal recess 19 designed to receive the rib 18. At the front it has a rounded longitudinal flange 20, which is formed and proportioned to fit in the concavity 17 under the downwardly directed lip 21 of the head 16. At the back the opening has a rounded face 22 which rests against the correspondingly rounded rear surface of the head 16 when the latter is disposed within the opening, as shown in Fig. 4. The flange 20 forms at the front of the openings 13 a groove 23 in which the lip 21 seats. The parts are so proportioned that the head 16 of the calk can be inserted in the opening by an arcuate movement around the flange 20. Underneath the latter the horseshoe is cut away at 24 so that an opening is formed between the front of the calk and the lower forward edge of the opening 13. The space so formed permits the insertion of the head of the calk and likewise is desired to receive the keeper 25. This is in effect a tapered wedge of rounded cross section. It can be driven into the opening formed between the calk and the horseshoe. The latter at both sides of the opening 13 is cut away, at 26, to form slots or grooves permitting the insertion of the keeper. At the extremities 27 the calk is longitudinally extended beyond the head 16 so that it will in effect seat against the under surface of the horseshoe at the sides of the opening 12, the head thus being smaller than the body of the calk, as is shown in Fig. 5.

The toe-calk is similar in every respect to the heel-calks already described except as to dimensions. It is of substantially elongated cross section, as is shown in Figs. 1 and 2, and comprises a point 15ª and a hook-shaped head 16ª. It is provided at the rear edge with a rib 18ª and the hook-shaped head terminates in a downwardly directed lip 21ª received in the groove 23ª formed at the front of the opening 12 by a flange 20ª. The inner surface 22ª of the recess 12 is rounded to receive the correspondingly rounded back portion of the head 16ª. At the front lower edge the opening 12 has a rounded cut away part 24ª which forms with the front of the calk a space to receive the wedge-shaped keeper 25ª. The calk head has at the front the concavity 17ª which corresponds to the concavity 17 of the calk 14. Instead of extending longitudinally of the horseshoe as in the previous case the keeper 25ª is disposed transversely thereof, the horseshoe having a cut away part 28 forming a groove to receive the keeper wedge. The toe-calk is, of course, inserted in the recess provided for the purpose and is secured in this recess in the same manner as the heel-calks. I prefer to provide the openings 12 and 13 with peripheral rims 29 and 30 respectively. These and other details of construction however, form no part of the invention and may be varied as desirable or necessary.

The inner series of openings will permit the shoe to be attached to a smaller hoof, thereby the same size of shoe can be used, within certain limits, for different sizes of hoofs.

I claim:

1. The combination with a horseshoe having a recess, of a calk having a point and a hook-shaped head, said recess being provided with a flange engaging under said hook-shaped head when the same is received in said recess, and a wedge-shaped keeper removably disposed between said head and the edge of said recess to secure said calk against displacement.

2. The combination with a horseshoe having a recess provided with an inwardly disposed flange, of a calk having a point and a hook-shaped head adapted to be received in said recess and to embrace said flange, and a wedge-shaped keeper removably disposed between said flange and said head to secure said calk against displacement.

3. The combination with a horseshoe having a recess provided with an inwardly disposed flange, of a calk having a point and a hook-shaped head adapted to be received in said recess and to embrace said flange, and a wedge-shaped keeper removably disposed between said flange and said head to secure said calk against displacement, said calk having at the rear edge a rib, said recess having a part formed to receive said rib.

4. The combination with a horseshoe having a recess provided with an inwardly disposed flange forming a groove, of a calk having a point and a hook-shaped head adapted to be received in said recess and to embrace said flange, said head having a downwardly directed flange received in said groove, said recess being cut away to form with said head of said calk an opening to receive a keeper, and a wedge-shaped keeper removably received in said last-mentioned opening.

5. The combination with a horseshoe having a recess provided with an inwardly disposed flange forming a groove, of a calk having a point and a hook-shaped head adapted to be received in said recess and to embrace said flange, said head having a downwardly directed flange received in said groove, said recess being cut away to form with said head of said calk an opening to receive a keeper, and a wedge-shaped keeper removably received in said last-mentioned opening, said calk having at the rear edge a rib, said recess having a part formed to receive said rib.

6. The combination with a horseshoe having a recess provided with a rounded flange extending longitudinally thereof, of a calk having a point and a head of round hook-shaped form adapted to embrace said flange, and provided at the front with a concavity into which said flange will fit and a keeper for securing the calk in the recess fitting intermediate the calk and the edge of the recess.

In testimony whereof I have signed my name to this specification in the presence of two subscribing witnesses.

FRANK F. HEISELMANN.

Witnesses:
VALENTINE SAUER,
RICHARD BLUDON.

Copies of this patent may be obtained for five cents each, by addressing the "Commissioner of Patents, Washington, D. C."